US00RE40738E

(19) United States
(12) Reissued Patent
Stewart

(10) Patent Number: US RE40,738 E
(45) Date of Reissued Patent: Jun. 16, 2009

(54) ACTIVE MATRIX ELECTROLUMINESCENT DISPLAY AND METHOD OF OPERATION

(76) Inventor: Roger G. Stewart, 15400 Vineyard Blvd., Unit 427, Morgan Hill, CA (US) 95037

(21) Appl. No.: 08/447,717

(22) Filed: May 23, 1995

Related U.S. Patent Documents

Reissue of:
(64) Patent No.: 5,302,966
Issued: Apr. 12, 1994
Appl. No.: 07/892,464
Filed: Jun. 2, 1992

(51) Int. Cl.
*G09C 3/30* (2006.01)

(52) U.S. Cl. ..... 345/76; 345/77; 315/169.3
(58) Field of Classification Search ..... 345/87, 345/92, 89, 94, 96, 589, 76–83, 55, 90, 205, 345/206, 208, 209; 315/169.3; 313/463, 498
See application file for complete search history.

(56) References Cited

U.S. PATENT DOCUMENTS

| | | | | |
|---|---|---|---|---|
| 3,590,156 | A | 6/1971 | Easton | 178/7.5 D |
| 3,761,617 | A | 9/1973 | Tsuchiya et al. | 178/7.3 D |
| 4,006,383 | A | 2/1977 | Luo et al. | 315/169 |
| 4,087,792 | A | 5/1978 | Asars | 340/166 EL |
| 4,114,070 | A | 9/1978 | Asars | 315/169 TV |
| 4,193,095 | A | 3/1980 | Mizushima | |
| 4,482,841 | A | 11/1984 | Tiku et al. | 313/503 |
| 4,528,480 | A | 7/1985 | Unagami et al. | 315/169.1 |
| 4,532,506 | A | 7/1985 | Kitazima et al. | 340/784 |
| 4,554,539 | A | 11/1985 | Graves | 340/805 |

(Continued)

FOREIGN PATENT DOCUMENTS

EP 0 457 440 A2 4/1991

OTHER PUBLICATIONS

Salerno et al., "5.7: Late–News Paper: Single–Crystal Silicon Transmissive AMLCD", SID 92 Digest, pp. 63–66 (1992).
Suzuki et al., "19.2: Late–News Paper: The Fabrication of TFEL Displays Driven by a a–Si TFTs", SID 92 Digest, pp. 344–347 (1992).
Vanfleteren et al., "Evaluation of a 64×64 CdSe TFT Addressed ACTFEL Display Demonstrator", IEEE, pp. 134–136 (1991).
Vanfleteren et al., "Design of a Prototype Active Matrix CdSe TFT Addressed EL Display", Sep. 24, 1991.
Vanfleteren et al., "Active Matrix CdSe TFT Addressed Electroluminescent Displays", 1988 International Display Research Conference, pp. 74–76 (1988).
Channing D et al: "El Addressing Technology" US Playa Del Rey, SID, 1989, p. 54–57 XP000076837 * p. 55, right–hand column, line 1–p. 56, right–hand column, last paragraph * figure 8, 9.
European Search Report corresponding to Application No. 97200425.3–2205.
P. De Visschere, I. De Rycke, J. Doutreloigne, J. Vanfleteren, "Active Matrix CdSe TFT Adressed Electroluminescent Displays" 1988 IEEE Internation Research Conf. pp. 74–76.

*Primary Examiner*—Jimmy H Nguyen

(57) ABSTRACT

An active matrix electroluminescent display (AMELD) having an improved light emitting efficiency and methods of operating the AMELD to produce gray scale operation comprises a plurality of pixels, each pixel including a first transistor having its gate connected to a select line, its source connected to a data line and its drain connected to the gate of a second transistor, the second transistor having its source connected to the data line and its drain connected to a first electrode of an electroluminescent (EL) cell. The EL cell's second electrode is connected to alternating high voltage means. A method for producing gray scale performance including the step of varying the length of time the second transistor is on while the alternating voltage is applied to the EL cell is also disclosed.

21 Claims, 9 Drawing Sheets

U.S. PATENT DOCUMENTS

| | | | | |
|---|---|---|---|---|
| 4,602,192 | A | | 7/1986 | Nomura et al. |
| 4,613,793 | A | | 9/1986 | Panicker et al. ..... 315/169.3 |
| 4,652,872 | A | | 3/1987 | Fujita ..... 340/781 |
| 4,736,137 | A | | 4/1988 | Ohwada et al. ..... 315/169.3 |
| 4,797,667 | A | | 1/1989 | Dolinar et al. ..... 340/781 |
| 4,954,747 | A | | 9/1990 | Tuenge et al. ..... 313/506 |
| 4,958,105 | A | | 9/1990 | Young et al. ..... 315/169.3 |
| 4,962,374 | A | | 10/1990 | Fujioka et al. ..... 340/781 |
| 4,963,861 | A | | 10/1990 | Thioulouse et al. ..... 340/781 |
| 4,975,691 | A | | 12/1990 | Lee ..... 340/781 |
| 5,003,302 | A | | 3/1991 | Richard et al. ..... 340/719 |
| 5,028,916 | A | | 7/1991 | Ichikawa et al. ..... 340/784 |
| 5,063,378 | A | | 11/1991 | Roach ..... 340/784 |
| 5,079,483 | A | | 1/1992 | Sato ..... 315/169.3 |
| 5,095,248 | A | | 3/1992 | Sato ..... 315/169.3 |
| 5,172,032 | A | | 12/1992 | Alessio ..... 315/169.3 |
| 5,262,766 | A | * | 11/1993 | Sakamoto et al. ..... 345/77 |
| 5,559,402 | A | * | 9/1996 | Corrigan, III ..... 345/76 |
| 5,576,601 | A | * | 11/1996 | Koenck et al. ..... 345/77 |

* cited by examiner 206
205
200
204a
204b
204c
202

202

202

206
206
202

210
204a
204b
204c
202

208
212
220
210
216
216
214
218
218

222
224

222
226
226

226
228
226

234
230
232
234
204a
204b
204c
202

ACTIVE MATRIX ELECTROLUMINESCENT DISPLAY AND METHOD OF OPERATION

Matter enclosed in heavy brackets [ ] appears in the original patent but forms no part of this reissue specification; matter printed in italics indicates the additions made by reissue.

This invention is an active matrix electroluminescent display (AMELD) having an improved light emitting efficiency and methods of operating the AMELD to produce gray scale operation.

BACKGROUND OF THE INVENTION

Thin film electroluminescent (EL) displays are well known in the art and are used as flat screen displays in a variety of applications. A typical display includes a plurality of picture elements (pixels) arranged in rows and columns. Each pixel comprises an EL phosphor active layer between a pair of insulators and a pair of electrodes.

Early EL displays were only operated in a multiplexed mode. Recently active matrix technology known in the liquid crystal display art has been applied to EL displays. A known AMELD includes a circuit at each pixel comprising a first transistor having its gate connected to a select line, its source connected to a data line and its drain connected to the gate of a second transistor and through a first capacitor 22 to ground. The drain of the second transistor is connected to ground potential, its source is connected through a second capacitor to ground and to one electrode of an EL cell. The second electrode of the EL cell is connected to a high voltage alternating current source for excitation of the phosphor.

This AMELD operates as follows. During a first portion of a frame time (LOAD) all the data lines are sequentially turned ON. During a particular data line ON, the select lines are strobed. On those select lines having a select line voltage, transistor 14 turns on allowing charge from data line 18 to accumulate on the gate of transistor 20 and on capacitor 22, thereby turning transistor 20 on. At the completion of the LOAD cycle the second transistors of all activated pixels are on. During the second portion of the frame time (ILLUMINATE), the AC high voltage source 28 is turned on. Current flow from the source 28 through the EL cells 26 and the transistor 20 ground in each activated pixels, producing an electroluminescent light output from the activated EL cell.

This AMELD and known variants require a number of components at each pixel and do not have gray scale operation. Thus there is a need for alternative AMELDs having fewer components and gray scale operation.

SUMMARY OF THE INVENTION

The invention is an AMELD comprising a plurality of pixels, each pixel including a first transistor having its gate connected to a select line, its source connected to a data line and its drain connected to the gate of the second transistor; the second transistor having its source connected to the data line and its drain connected to a first electrode of an electroluminescent (EL) cell and the EL cell having its second electrode connected to means for providing alternating voltage between the second electrode of the EL cell and a source of reference potential. The invention is also a method for producing gray scale performance by varying the length of time that the EL cell of a given pixel is on during the period of high voltage excitation of the pixel array.

DETAILED DESCRIPTION

Figure 1:
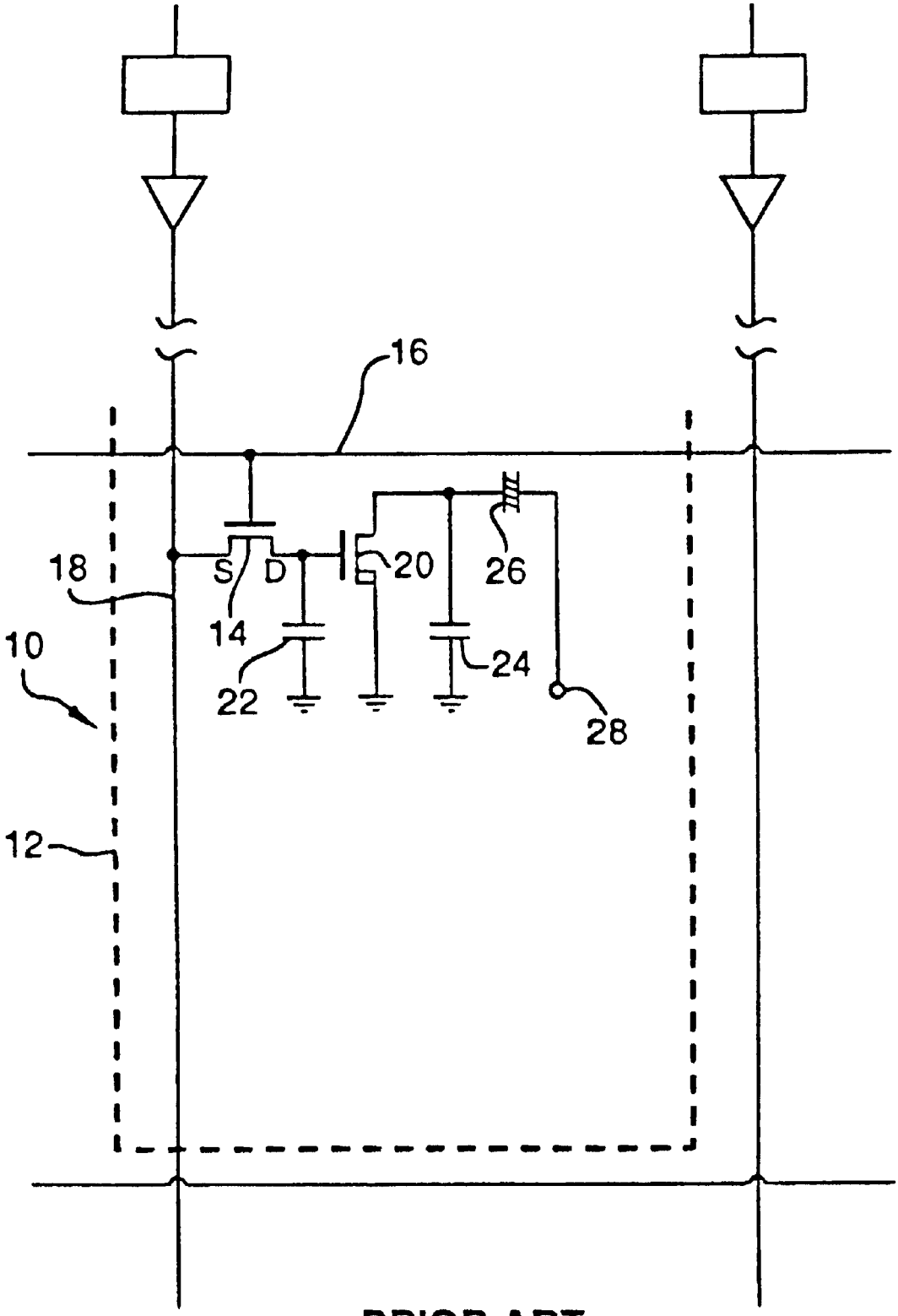
PRIOR ART Fig. 1
FIG. 1 is a schematic circuit diagram for a pixel of a prior art AMELD.

In FIG. 1 a prior art AMELD 10 includes a plurality of pixels arranged in rows and columns. The active matrix circuit at a pixel 12, i.e. the pixel in the Ith row and the Jth column comprises a first transistor 14 having its gate connected to a select line 16, its source connected to a data line 18 and its drain connected to the gate of a second transistor 20 and through a first capacitor 22 to ground. The source of transistor 20 is connected to ground, its drain is connected through a second capacitor 24 to ground and to one electrode of an EL cell 26. The second electrode of the EL cell 26 is connected to a high voltage alternating current source 28.

During operation, the 60 Hertz (Hz) field period of a frame is subdivided into separate LOAD and ILLUMINATE periods. During a LOAD period, data is loaded, one at a time, from the data line through transistor 14 allowing charge from data line 18 to accumulate on the gate of transistor 20 and on capacitor 22, in order to control the conduction of transistor 20. At the completion of the LOAD period, the second transistors of all activated pixels are on. During the ILLUMINATE period, the high voltage alternating current source 28 connected to all pixels is turned on. Current flows from the source 28 through the EL cell 26 and the transistor 20 to ground in each activated pixels, producing an electroluminescent light output from the pixel's EL cell.

Figure 2:
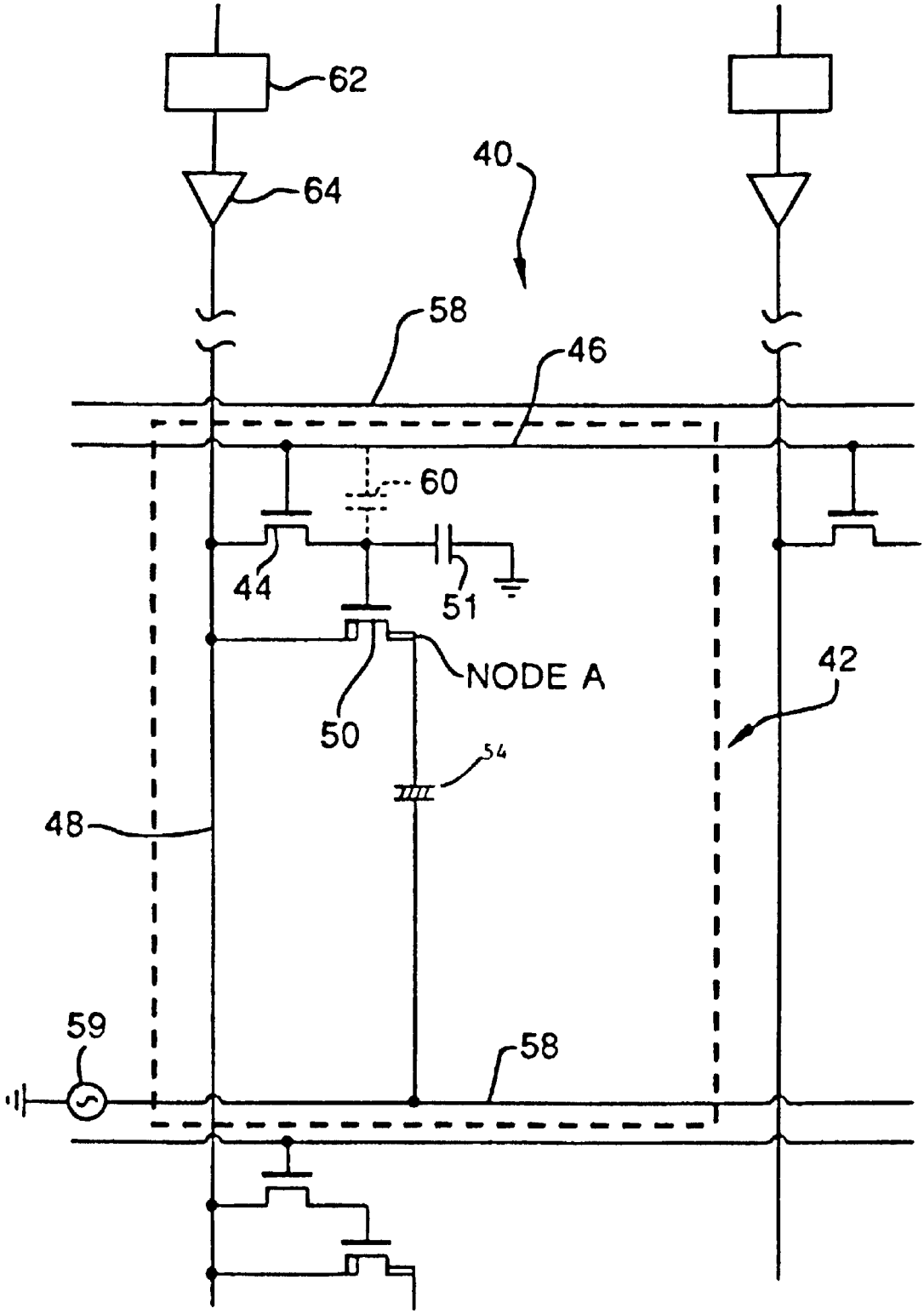
FIG. 2 is a schematic circuit diagram for a pixel of an AMELD of the invention.

In FIG. 2, an AMELD 40 includes a plurality of pixels arranged in rows and columns. The active matrix circuit at a pixel 42 comprises a first transistor 44 having its gate connected to a select line 46, its source connected to a data line 48 and its drain connected to the gate of a second transistor 50. A capacitor 51 is preferably connected between the gate of the second transistor 50 and the source of reference potential. The source of transistor 50 is also connected to the data line 48 and its drain connected to one electrode of an EL cell 54. The second electrode of the EL cell 54 is connected to a bus 58 for a single, resonant, 10 kilohertz (KHz)-AC high-voltage power source, such as that shown in FIG. 4, to illuminate the entries array at the same time. Also shown therefore a parasitic capacitor 60 which is between the gate and drain of the transistor 44 therefore is typically present in this structure. Each data line of the AMELD 40 is driven by circuitry including an analog-to-digital converter 62 and a low impedance buffer amplifier 64. Despite its complicated appearance the active matrix circuit actually comprises only a small fraction of the pixel area, even with pixel densities of up to 400 per/cm. An EL call is often shown in series with two capacitors which are the blocking capacitors formed as part of the structure of an EL cell.

Figure 2A:
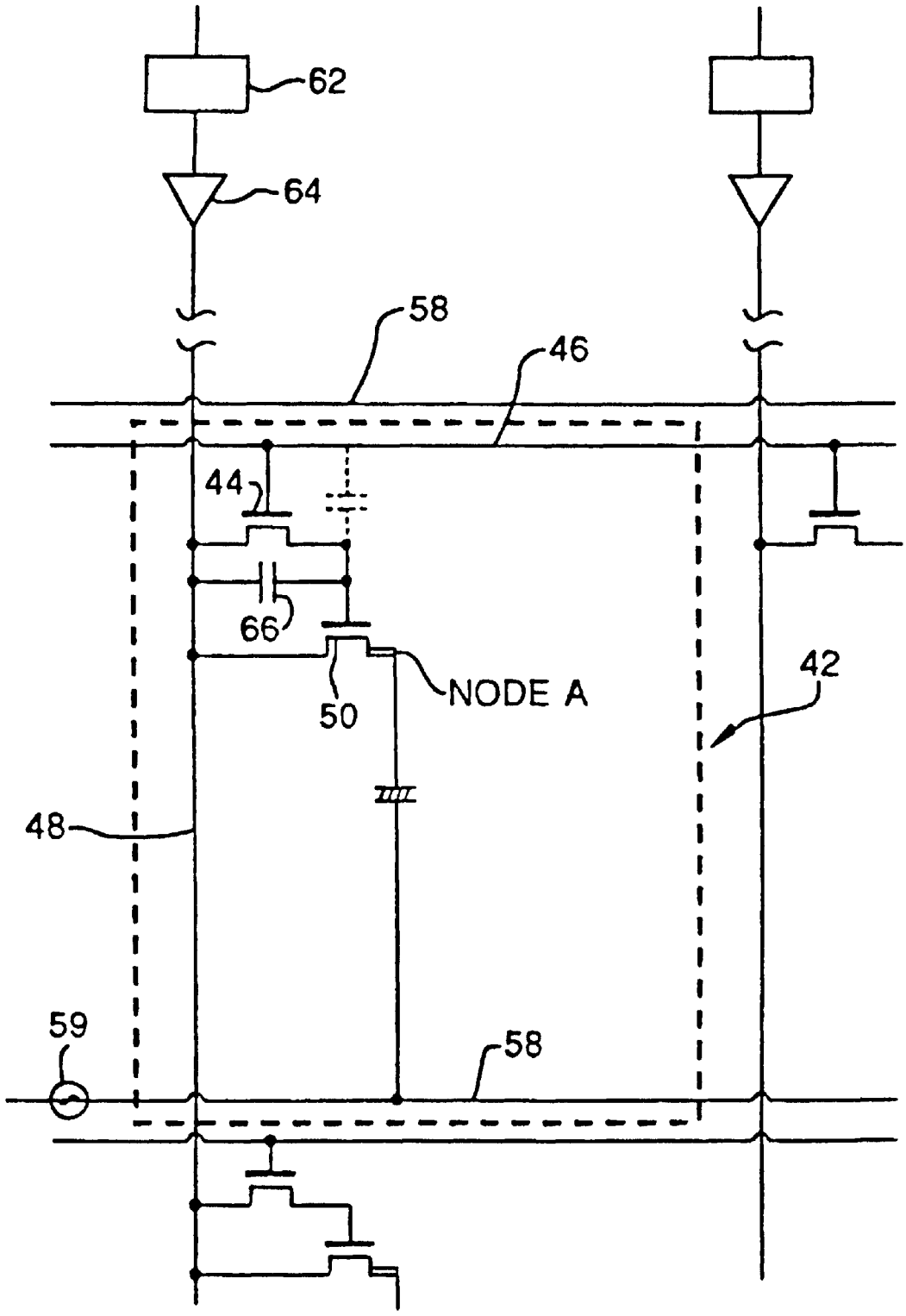
FIG. 2(a) an another embodiment of the AMELD of FIG. 2.

In FIG. 2(a) another embodiment of the AMELD 40 of FIG. 2 includes a capacitor 66 connected between the data line 48 and the gate of the transistor 50. Capacitor 51 is preferably present for analog grey scale operation of the AMELD 40. Capacitor 66 or capacitor 51 is preferably present for binary or digital grey scale operation of the AMELD 40.

Images are displayed on the AMELD as a sequence of frames, in either an interlace of progressive scan mode. During operation the frame time is sub-divided into separate LOAD periods such as ILLUMINATE periods. During LOAD periods, data is loaded, one at a time, from the data line through transistor 44 in order to control the conduction of transistor 50. During a particular data line ON, all select lines are strobed. On those select lines having a select line voltage, transistor 44 turns on allowing charge from data line 48 to accumulate on the gate of transistor 50, thereby turning transistor 50 on. At the completion of a LOAD period the second transistors of all activated pixels are on. During the ILLUMINATE period the high voltage AC source 59, connected to all pixels, is turned on. Current flows from the source 59 through the EL cell 54 and the transistor 50 to the data line 48 at each activated pixel, producing an electroluminescence light output from the activated pixel's EL cell.

The low impedance buffer amplifier 64 holds the voltage on the data line 48 at its nominal value during the ILLUMINATE period. The data and select line driver design is straightforward and well known since both data and select lines operate at low (15 V) voltages and low currents of about 0.1 milliampere (0.1 mA). These inexpensive drivers can either be built onto the substrate supporting the AMELD or built externally.

The data which are capacitively stored on the gate of transistor 50 operate through transistor 50 to control whether the pixel will be white, black, or gray. If, for example, the gate of transistor 50 stores a 5 V level (select @ −5 V and data @ 0 V), then transistor 50 will conduct through both the positive and negative transitions of the input voltage at the buss 58, which effectively grounds Node A. This allows all of the displacement current to flow from the input electrode 58 through the EL cell 54, which in turn lights up the pixel. If the gate of transistor 50 stores a −5 V level (select @ −5 V and data @ −5 V), then transistor 50 will remain off through all positive transitions of the input voltage at the input buss 58. Transistor 50 thus behaves like a diode which, in combination with the capacitance associated with the EL cell, will quickly suppress the flow of displacement current through the EL phosphor thereby turning the pixel off.

Accurate gray scale control of each pixel is readily achieved by varying the voltage on the data line during each of the individual (typically 128) ILLUMINATE sub-period during each field of a frame. The voltage variation can be a linear ramp of the voltage, a step function in voltage with each step corresponding to a level of gray or some other function. If, for example, the gate of transistor 50 stores a −1.5 V gray-scale level (select @ −5 V and, $V_{th}$=1 V) and the data line is ramped linearly from 5 V to −5 V during the field, then transistor 50 will conduct for precisely 32 of the 128 ILLUMINATE sub-cycles resulting in a time-averaged gray-scale brightness of 25%.

Figure 7:
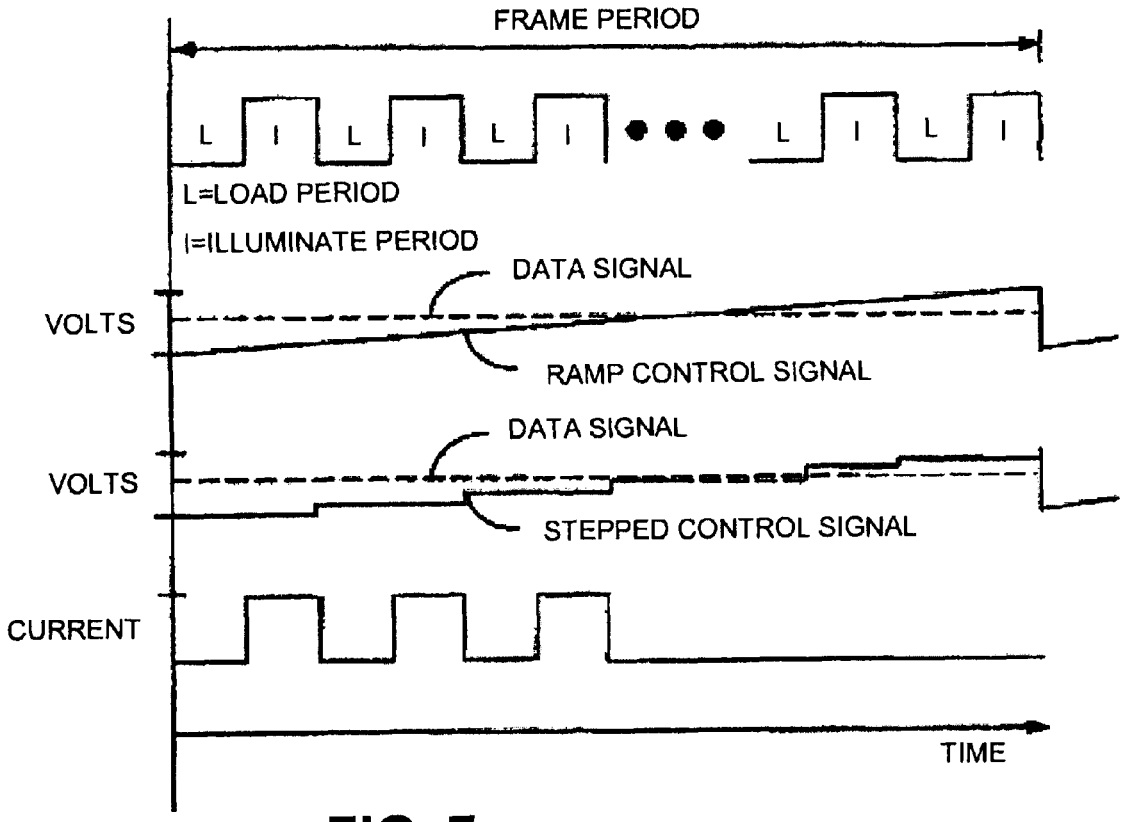
*FIG. 7 depicts an illustrative timing relationship of the signals used for gray scale control of the invention; and*

Note that the AMELD pixel always operates digitally even when displaying gray-scale information. All transistors are either fully-on or fully-off and dissipate no power in either state. When a pixel is off, it simply acts as if it is disconnected from the resonant power source and therefore doesn't dissipate or waste any power. The AMELD therefore steers almost 100% of the power from the high voltage source into the activated into the activated EL cells for light generation. *FIG. 7 depicts an illustrative timing relationship of the signals used for gray scale control including a frame time, a plurality of LOAD and ILLUMINATE periods, a drive current, data signals, a linear ramp control signal and a stepped control signal.*

Another method for providing gray scale control of the AMELD comprises executing, during a frame time, a number of LOAD/ILLUMINATE periods, preferably equal to or less than the number of bits used to define the levels gray. During the LOAD period of the first of these subframes, data corresponding to the least significant bit (LSB) is loaded into the circuitry of each pixel. During the ILLUMINATE period of this subframe, the high voltage source emits a number of pulses $N_{LSB}$. This procedure is repeated for each subframe up to the one corresponding to the most significant bit, with a greater number of pulses emitted for each more significant bit. For example, for an eight bit gray scale, the high voltage source emits one pulse for the LSB, two pulses for the next most significant bit, four pulses for the next most significant bit and so on, up to 128 pulses for the most significant bit; thereby weighting the excitation of the EL cell and its emission corresponding to the significant of the particular bit. This procedure is equivalent to dividing a frame into a number of subframes, each of which is then operated in a similar way to the procedure outlined above for no gray scale.

These approaches can be combined to handle several bits in one subframe by varying the voltage on the data line. For example, the effect of the LSB and the next LSB could be combined during the first subframe by varying the voltage on the data line to turn the second transistor off after one or three ILLUMINATE pulses.

Figure 8:
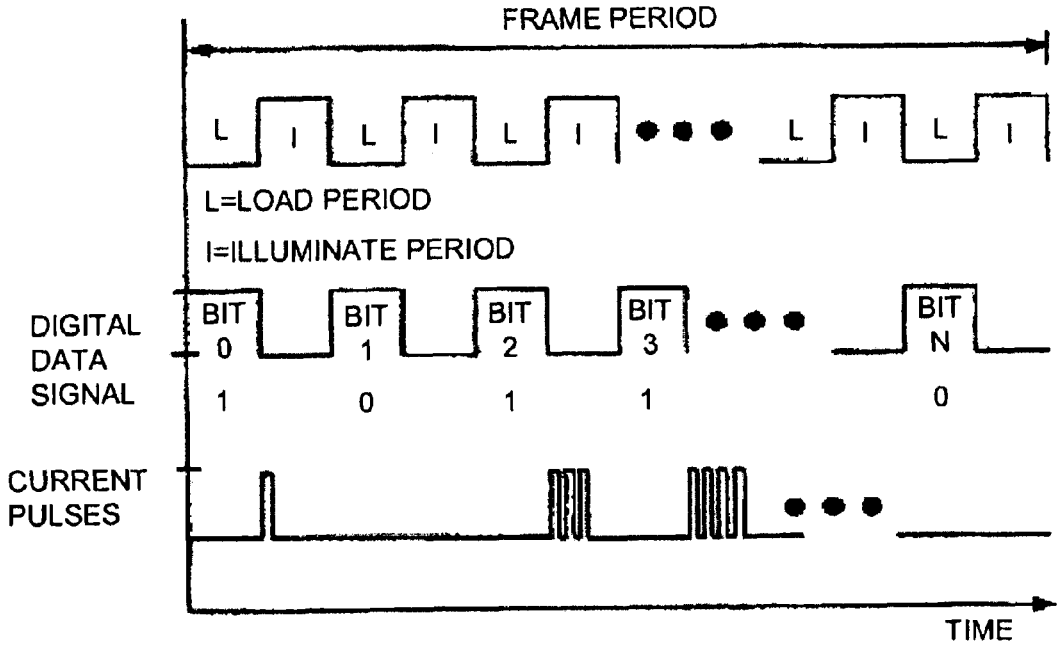
*FIG. 8 depicts an illustrative timing relationship of the signals used for digital gray scale control of the invention.*

The second transistor operates as a means for controlling the current through an electroluminescent cell. The gate is either on or off during the ILLUMINATE periods but gray scale information is provided by limiting the total energy supplied to the pixel. This is done by varying the length of time this second transistor is on during the ILLUMINATE period or by varying the number of ILLUMINATE pulses emitted during an ILLUMINATE period. *FIG. 8 depicts an illustrative timing relationship of the signals used for digital gray scale control including a frame time, a plurality of LOAD and ILLUMINATE periods, a drive current, data signal and a stepped control signal.*

An advantage of the AMELD display is that all pixel transistors may operate during all ILLUMINATE cycles. This reduces the total transistor driver scaling requirements to less than one μA for the AMELD of the invention. Also, the voltage standoff provided by transistor 50 means that the drain of transistor 50 is the only part of this circuit exposed to high voltages. This feature will greatly reduce the cost, improve the yield, and improve the realiability of an AMELD incorporating the principles of the invention.

Figure 3:
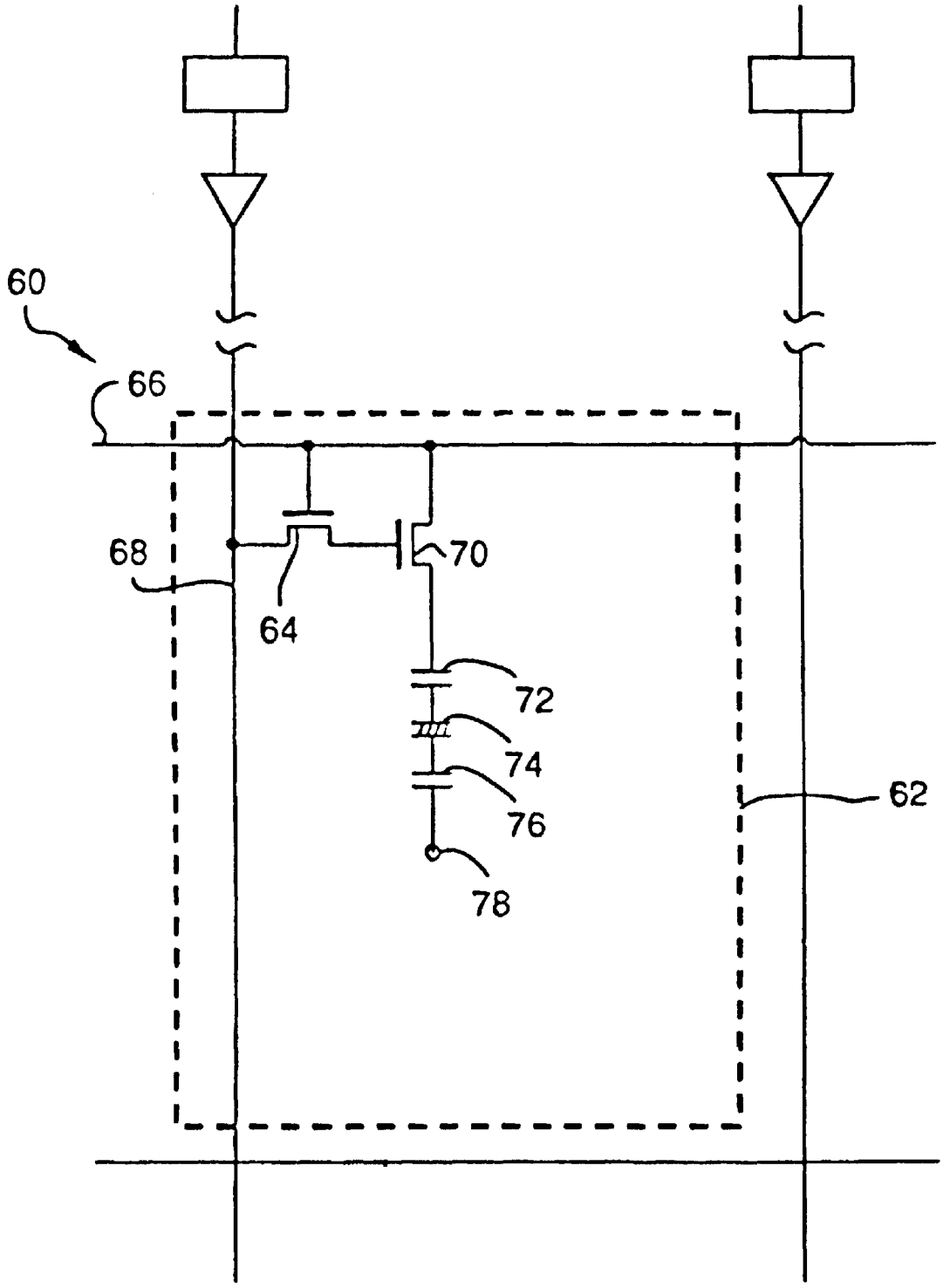
FIG. 3 is a schematic circuit diagram for a pixel of another embodiment of the AMELD of the invention.

In FIG. 3, an alternative AMELD 60 includes a plurality of pixels arranged in rows and columns. The active matrix circuit at a pixel 62, i.e. the pixel in the Ith row and the Jth column comprises a first transistor 64 having its gate connected to a select line 66, its source connected to a data line 68 and its drain connected to the gate of a second transistor 70. The drain of transistor 70 is also connected to the select line 66 and its drain connected through a first capacitor 72 to one electrode of an EL cell 74. The second electrode of the EL cell 74 is connected through a second capacitor 76 to a high voltage alternating current source 78.

Figure 4:
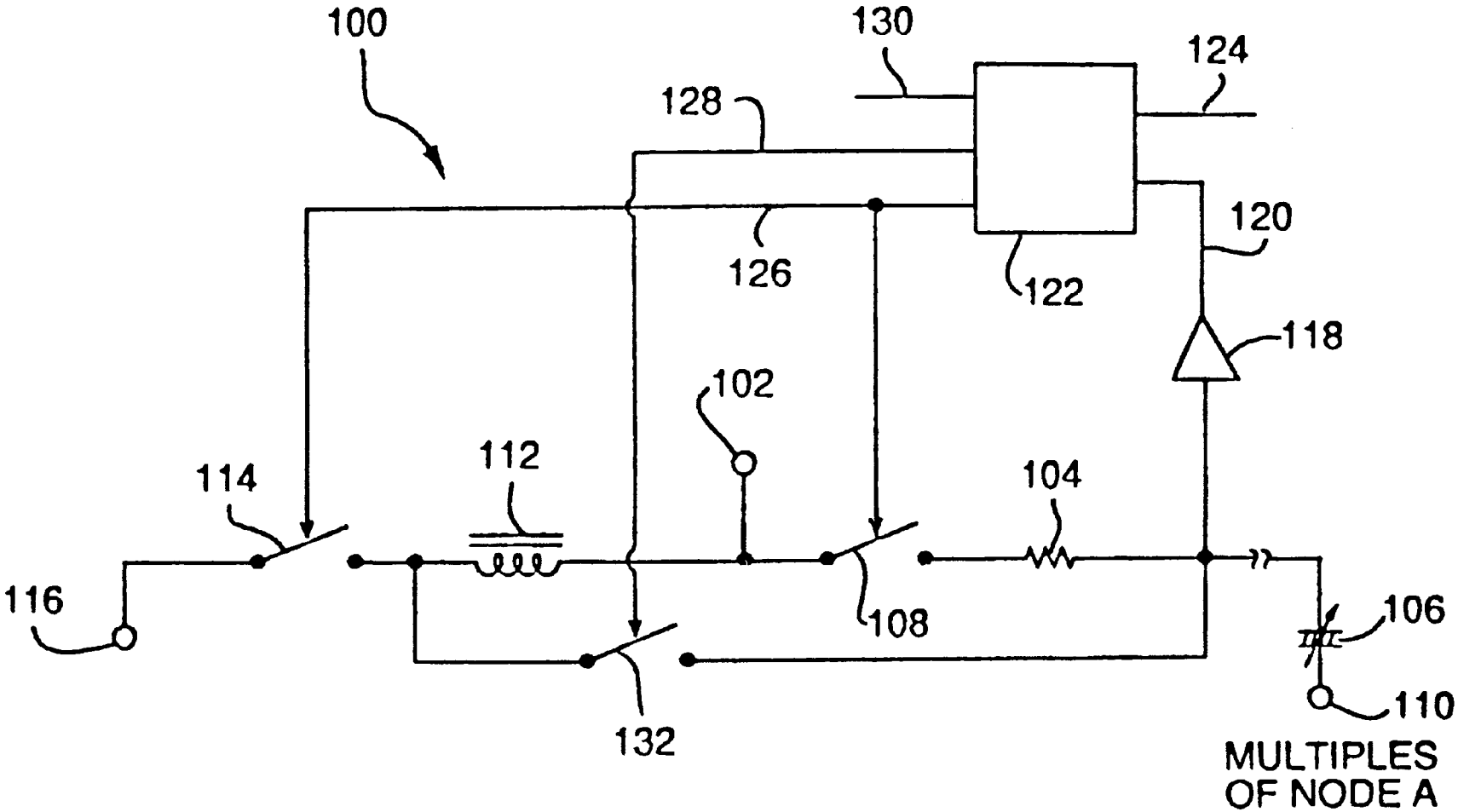
FIG. 4 is schematic circuit diagram for a high voltage alternating current source used in the AMELD of the invention.

In FIG. 4, a resonant 10 kHz, AC high voltage power source 100 capable of supplying power to the AMELD of the invention includes an input electrode 102 for receiving low voltage power at the desired pulse rate. A resistor 104 and an EL cell 106 are connected in series through a switch 108 between the electrode 102 and a node 110 which is all of the nodes A shown in FIG. 2. The EL cell 106 is shown as a variable capacitor because it behaves that way in the operation of the AMELD of the invention as discussed above. The input electrode 102 is also connected through an inductor 112 and a switch 114 to a source of reference potential 116. A comparator 118 is connected across the EL cell 106 to the reset input 120 of a set/reset latch 122. Set/reset latch 122 has a set input 124, an initial charge output 126, a bootstrap output 128 and an off output 130. The initial charge output 126, when activated, closes switches 108 and 114. The bootstrap output 128, when activated, open switches 108 and 114 and closes switch 132 which is connected across the input electrode 102, the inductor 112, the switch 108 and the resistor 104; thereby providing a direct connection between the inductor 112 and the input of the EL cell 106. In operation, switches 108 and 114 are initially closed, current flows from input electrode through resistor 104, EL cell 106 and through inductor 112 to reference potential until comparator 118 senses that the preselected voltage on the variable capacitor load 106 has been reached. At this time comparator 118 reaches the latch 122, opening switches 104 and 114 and closing switch 132. Inductor 112 then discharges through switch 132 and drives the voltage on the variable capacitor 106 to a fixed multiple of the preselected voltage. The values of the resistor 104 and the inductor 112 are chosen to provide a multiplication of the voltage applied to the input electrode 102. Preferably, the impedance of the resistor and inductor are such that a large fraction of the energy flows to the inductor. Approximately ninety-five percent of the current would flow into the inductor to achieve a voltage multiplication of twenty.

The AMELD of the invention can be formed using one of several semiconductor processes for the active matrix circuitry. The process which I believe will produce the best performance uses crystalline silicon (x-Si) as the material in which the high voltage transistors are formed. This process comprises forming the high voltage transistors, pixel electrodes an peripheral drive logic in/on the x-Si layer, and depositing the phosphors and other elements of the EL cell.

The key aspect of forming the x-Si layer is the use of the isolated silicon (Si) epitoxy process to produce a layer of high quality Si on a insulating layer as disclosed for exemplary by Salerno et al in the Society For Information Display SID 92 Digest, pages 63–66. x-Si-on-insulator material (x-SOI) is formed by first growing a high quality thermal silicon oxide ($SiO_x$) of the desired thickness on a standard silicon wafer depositing a polycrystalline silicon (poly-Si) layer on the $SiO_x$ and capping the poly-Si layer with an $SiO_x$ layer. The wafer is then heated to near the melting point of Si and a thin movable strip heater is scanned above the surface of the wafer. The movable heater melts and recrystallizes the Si layer that is trapped between the oxide layers, producing single crystal Si layer. A particular advantage of the x-SOI process is the use of grown $SiO_x$, which can be made as thick as necessary, and much thicker and more dense than ion-implemented $SiO_x$ layers.

Figures 5A, 5B, 5C, 5D, 5E, 5F, 5G, 5H, 5I, 5J:
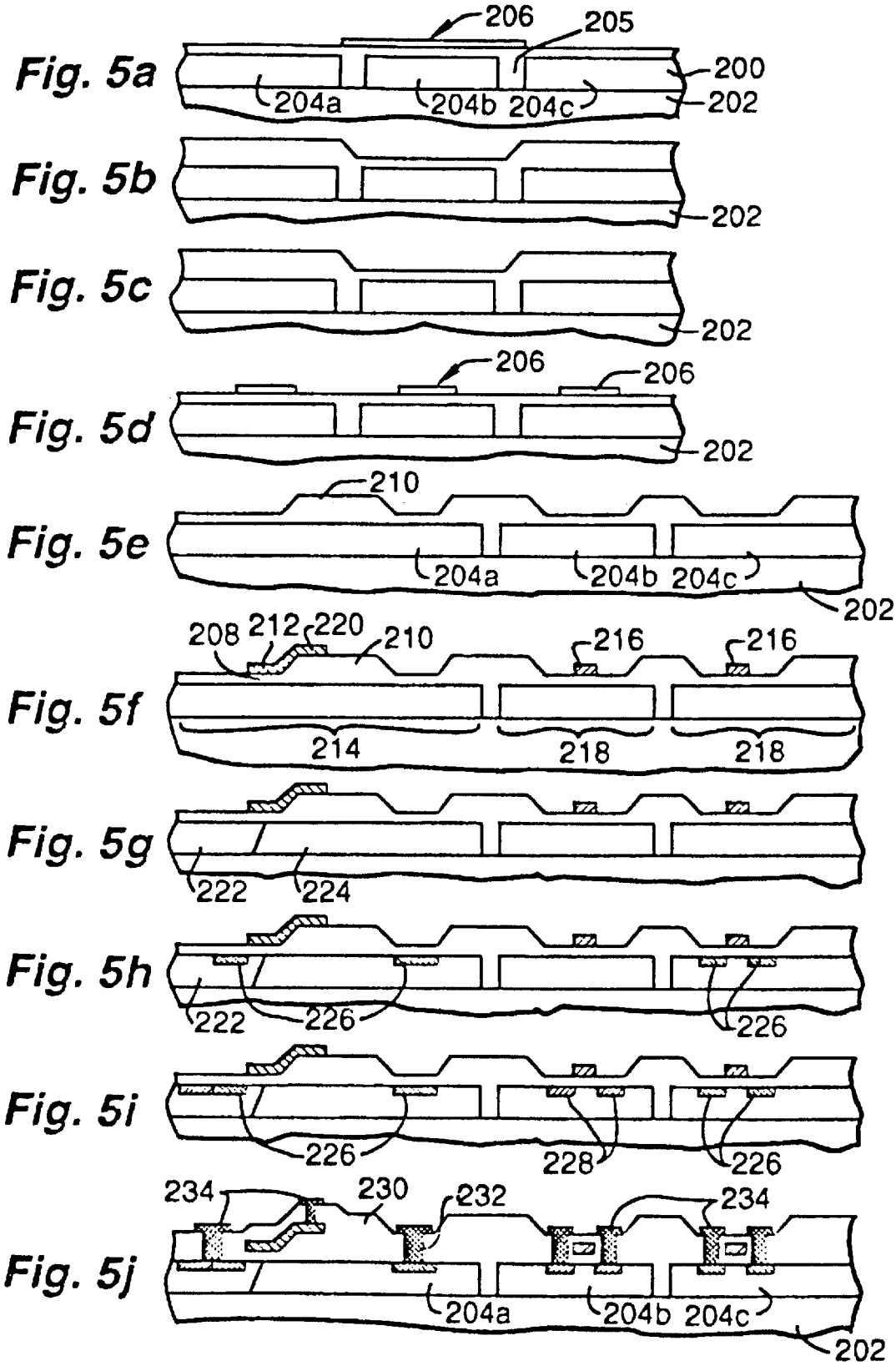
FIG. 5(a) to (j), is a schematic cross-sectional illustration of steps in a process for forming the active matrix circuitry.

The circuitry in/on the x-SOI is formed using a high voltage BiCMOS process for the fabrication of BiCMOS devices, such as transistors and peripheral scanners. Results indicate that high voltage (HV) transistors can be fabricated with breakdown voltages of over 100 V in/on 1 μm thick x-SOI. In FIG. 5(a) to (j), the high voltage BiCMOS process, shown schematically, starts with the etching of the $N^-$ conductivity type x-SOI layer 200, typically about 1 μm thick, on the dielectric layer 202 into discrete islands 204a, 204b and 204c isolated by oxide 205, forming both the P- and N-wells using masking and ion implantation steps; first of an N-type dopant, such as arsenic, then of a P-type dopant, such as boron, as shown, to form the N-type wells 204a and 204c and the P-type wells 204b. Masks 206, typically formed of SiON, are shown in FIGS. 5(a) and (d). A channel oxide 208 and a thick field oxide 210 and are then grown over the surface of the Si islands to define the active regions, poly-Si is then deposited and defined to form the gate 212 of the high voltage DMOS transistor 214 and the gates 216 of the low voltage CMOS transistors 218. In FIG. 5(f), the gate 212 of the DMOS transistor extends from the active region over the field oxide, forming a field plate 220. The edge of the gate 212 that is over the active region is used as a diffusion edge for the $P^-$-channel diffusion 222 while the portion of the gate that is over the field oxide is used to control the electric field in the $N^-$-type conductivity drift region 224 of the DMOS transistor 214. The $N^+$-channel source/drain regions 226 are formed using arsenic ion implantation. The $P^+$-channel source/drain regions 228 are then formed using boron ion implantation. The process is completed by depositing a borophosphosilicate glass (BPSG) layer 230 over the structure, flowing the BPSG layer 230, opening vias 232 down to the Si islands 204, and interconnecting the devices using aluminum metallization 234. The process has nine mask steps and permits the fabrication of both DMOS and CMOS transistors.

In operation, the $N^+$-$P^-$ junction of the DMOS transistor 214 switches on at low voltage causing the transistor to conduct, while the $N^-$-$N^+$ junction holds off the voltage applied to the EL cell when the DMOS transistor is not conducting.

The high voltage characteristics of the DMOS transistors depend on several physical dimensions of the device as well as the doping concentrations of both the diffused P-channel and N-well drift region. The total channel length for a 300 V transistor is typically about 30 μm. The important physical dimensions are the length of the N-well drift region, typically about 30 μm, the spacing between the edge of the poly-Si gate in the active region and the edge of the underlying field oxide, typically about 4 μm, and the amount of overlap, typically about 6 μm, between the poly-Si gate over the field oxide and the edge of the field oxide. The degree of current handling in the DMOS transistor is also a function of some of these parameters as well as a function of the overall size of the transistor. Since a high density AMELD having about 400 pixels/cm is desirable, the pixel area (and hence the transistors) must be kept as small as possible. In some cases, however, the conditions that produce high voltage performance also reduce the overall current handling capability of the transistor and therefore require a large transistor area for a given current specification. For example, the N-well doping concentration controls the maximum current and breakdown voltage inversely, usually making careful optimization necessary. However, this is much less of a factor in this approach, since the design eliminates the requirement for high current (only 1 μA/pixel needed).

The layer thicknesses can be adjusted to provide the required breakdown voltages and isolation levels for the transistors in the AMELD. High quality thermal $SiO_x$ can be easily grown to the required thickness. This tailoring cannot be obtained easily or economically by other techniques. This x-SOI is characterized by high crystal quality and excellent transistors. A second advantage of the x-SOI process is the substrate removal process. Owing to the tailoring of the oxide layer beneath the Si layer, the substrate can be removed using lift-off techniques, and the resultant thin layer can be remounted on a variety of substrates such as glass, lexan, or other materials.

The process for forming the EL cell, whether monochrome or color, begins with the formation of the active matrix circuitry. The next steps are sequentially depositing the bottom electrode, which is preferably the source or drain metallization of the second transistor in the pixel circuit, the bottom insulating layer, the phosphor layer and the top insulating layer. The top insulating layers are then patterned to expose the connection points between the top electrodes and the active matrix, and also to remove material from the areas to which external connections will be made to the driver logic. The top transparent electrode, typically indium tin oxide, is then deposited and patterned. This step also serves to complete the circuit between the phosphors and the active matrix.

The process for forming a color phosphor layer comprises depositing and patterning the first phosphor, depositing an etch stop layer, depositing and patterning the second phosphor, depositing a second etch stop layer, and depositing and patterning the third phosphor. This array of patterned phosphors is then coated with the top insulator. Tuenge et al in U.S. Pat. No. 4,954,747 have disclosed a multicolor EL display including a blue $SrS:CeF_3$ or ZnS:Tm phosphor or a group II metal thiogallate doped with cerium, a green $ZnS:TbF_3$ phosphor and a red phosphor formed from the combination of ZnS:Mn phosphor and a filter. The filter is a red polyimide or CdSSe filter, preferably $CdS_{0.62}Se_{0.38}$, formed over the red pixels, or alternatively, incorporated on the seal cover plate if a cover is used. The red filter transmits the desired red portion of the ZnS:Mn phosphor (yellow) output to produce the desired red color. These phosphors and filters are formed sequentially using well known deposition, patterning and etching techniques.

The insulating layers may be $Al_2O_3$, $SiO_2$, SiON or $BaTa_2O_6$ or the like between about 10 and 80 nanometers (nm) thick. The dielectric layers may be $Si_3N_4$ or SiON. The presence of the insulating oxide layers improves the adhesion of the $Si_3N_4$ layers. The dielectric layers are formed by sputtering, plasma CVD or the like and the insulating oxide layers by electron beam evaporation, sputtering, CVD or the like. The processing temperature for the insulator deposition steps is about 500° C. The silicon wafer is exposed to a maximum temperature during processing would be 750° C. which is necessary to anneal the blue phosphor.

Figure 6:
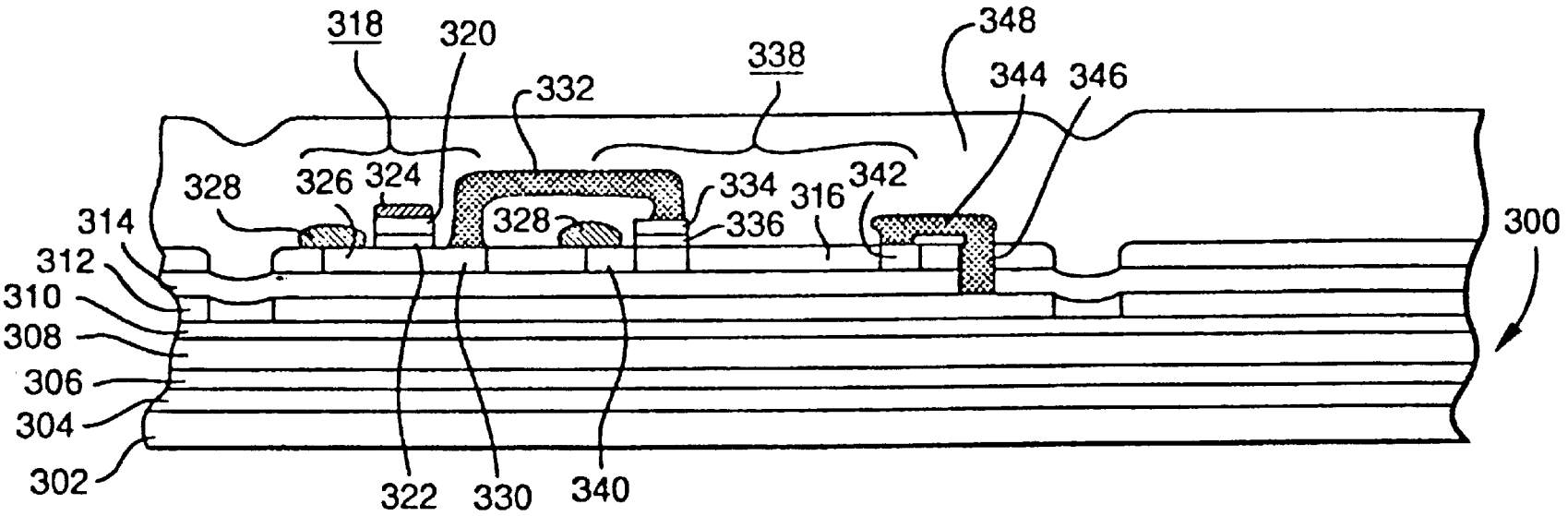
FIG. 6 is a cross-sectional illustration of the structure of an alternative embodiment of the AMELD of the invention.

An alternative process to form the AMELD of the invention when a large area display is desired includes forming the transistors in amorphous silicon (a-Si) or poly-Si, although a-Si is preferred because better high voltage devices can presently be fabricated in a-Si as disclosed, for example, by Suzuki et al in the Society For Information Display SID 92 Digest, pages 344–347. In this case, whether a-Si or poly-Si is used, the process of forming the AMELD is reversed; the EL cell is first formed on a transparent substrate and the transistors are formed on the EL cell. In FIG. 6 an AMELD 300 incorporating a-Si transistors includes a transparent substrate 302, a transparent electrode 304, a first insulating layer 306, an EL phosphor layer 308 patterned as described above, a second insulating layer 310, a back electrode 312 and an isolation layer 314. The active matrix circuitry is formed on the isolation layer 314 in/on a a-Si island 316 deposited using standard glow discharge in silane techniques and isolated from adjacent islands using standard masking and etching techniques to define the pixels along with the segmentation of the back electrode 312. It is understood that the pixels can equally well defined by segmenting the transparent electrode 304.

The first transistor 318 includes a gate 320 overlying a gate oxide 322 and connected to a select line 324, a source region 326 connected by a data line bus 328, a drain region 330 connected by conductor 332 to a gate 334 overlying a gate oxide 336 of a second transistor 338. The second transistor 336 has a source region 340 contacted to the data line bus 328 and a drain region 342 connected by conductor 344 through opening 346 to the back electrode 312. The entire assembly is sealed by depositing a layer of an insulator 348 composed of a material such as BPSG.

It is to be understood that the apparatus and the method of operation taught herein are illustrative of the general principles of the invention. Modifications may readily be devised by those skilled in the art without departing from the spirit and scope of the invention. For example, different layouts of the components in a pixel are possible. Still further, the invention is not restricted to a particular type of high voltage excitation and pulse shape, to a particular type of power source or its capacity to a particular transistor type. The system provided by the invention is not restricted to operation at a particular frequency.

I claim:

1. An electroluminescent display comprising an array of pixels, each pixel including a first transistor having its gate connected to a select line, its source connected to a data line and its drain connected to the gate of a second transistor;

the second transistor having it source connected to the data line and its drain connected to a first electrode of an electroluminescent cell; and said electroluminescent cell having a second electrode which is connected to means for providing an alternating voltage power source with the voltage power source means being connected between the second electrode and a source of reference potential.

2. The display of claim 1 wherein the means for providing an alternating voltage power source comprises a resonant alternating current high voltage power source.

3. The display of claim 2 wherein the power source includes:

first means for receiving an input voltage;

a resistor connected at one end and in series through a first switch to the first means and at another end to the second electrode of the electroluminescent cell;

an inductor connected to the first means and in series through a second switch to a source of reference potential;

a third switch connected across the first means, the inductor, the first switch and the resistor;

a comparator having an input connected to the second electrode of the electroluminescent cell and its output connected to an input of a set/reset latch, the latch having a second input, and first and second outputs;

wherein the first output of the latch, when activated, closes the first and second switches, the second output of the latch, when activated opens the first and second switches and closes the third switch;

wherein the values of the resistor and the inductor are chosen to provide a multiplication of the voltage applied to the first means.

4. The display of claim 1 wherein the second transistor is a drift type MOS transistor.

5. The display of claim 4 further comprising a capacitor connected between the gate of the second transistor and a source of reference potential.

6. The display of claim 4 further comprising a capacitor connected between said data line and the gate of the second transistor.

7. A method of operating an active matrix electroluminescent display, said display comprising a plurality of pixels, each pixel including a first transistor having its gate connected to a select line, its source connected to a data line and its drain connected to the gate of a second transistor; the second transistor having its source connected to the date line and its drain connected to a first electrode of an electroluminescence cell, the electroluminescent cell having a second electrode, the method comprising the steps of applying voltages to the select and data lines to enable the second transistor of a given pixel;

applying a power source to the second electrode of the electroluminescent cell of the given pixel for a period of time; and disabling the second transistor of the given pixel prior to the conpletion of said period of time.

*8. In an electroluminescent display comprising an array of pixels, where each pixel contains a circuit for controlling application of energy to an electroluminescent cell associated with each pixel in said array of pixels, a method of providing gray scale illumination during a frame time comprising the steps of:*

*subdividing said frame time into a plurality of LOAD periods and a plurality of ILLUMINATE periods;*

*loading, during each LOAD period, data from a data line into said circuit; and*

*varying, during each of said ILLUMINATE periods, a voltage on the data line, to selectively illuminate said electroluminescent cell in response to said voltage and said data.*

*9. The method of claim 8 wherein said voltage on said data line is a linear ramp.*

*10. The method of claim 8 wherein said voltage on said data line is a step function.*

*11. The method of claim 8 wherein, during each ILLUMINATE period, a high voltage power supply applies at least one pulse to said circuit and, in response to said voltage, said at least one pulse is applied to said electroluminescent cell.*

*12. An electroluminescent display comprising an array of pixels for providing gray scale illumination during a frame time, where said frame time is divided into a number of LOAD and ILLUMINATE periods, each pixel comprising:*

*a first transistor and a second transistor;*

*said first transistor having a first transistor gate, a first transistor source and a first transistor drain, where said first transistor gate is connected to a select line, said first transistor source is connected to a data line and said first transistor drain is connected to a second transistor gate of said second transistor;*

*said second transistor having said second transistor gate, a second transistor source and a second transistor drain, where said second transistor source is connected to said data line and second transistor drain is connected to an electroluminescent cell;*

*during each of said LOAD periods and when a select line signal on the select line activates the first transistor, said data line supplies, through said first transistor, a data signal to the second transistor gate where said data signal is stored; and*

*during each of said ILLUMINATE periods, said data line supplies a voltage to said second transistor to control illumination of said electroluminescent cell.*

*13. The display of claim 12 wherein said voltage is a linear ramp.*

*14. The display of claim 12 wherein said voltage is a step function.*

*15. An electroluminescent display comprising an array of pixels for providing gray scale illumination during a frame time, where said frame time is divided into a number of LOAD and ILLUMINATE periods, each pixel comprising:*

*a control circuit, connected to a select line, a data line and a first electrode of an electroluminescent cell, for selectively applying energy to said electroluminescent cell in response to signals carried by said select line and said data line;*

*during each of said LOAD periods and when a select line signal on the select line activates the control circuit, said data line supplies a data signal to the control circuit where said data signal is stored; and*

*during each of said ILLUMINATE periods, in response to a state of said stored data signal, said control circuit applies pulsed energy from a power supply means to a second electrode of said electroluminescent cell for a particular period of time.*

*16. The display of claim 15 wherein a number of ILLUMINATE periods and LOAD periods that are used to illuminate said electroluminescent cell during a frame time is equivalent to a number of bits used to define a number of levels of gray.*

*17. The display of claim 15 wherein said control circuit further comprises:*

*a first transistor and a second transistor;*

*said first transistor having a first transistor gate, a first transistor source and a first transistor drain, where said first transistor gate is connected to a select line, said first transistor source is connected to a data line and said first transistor drain is connected to a second transistor gate of said second transistor; and*

*said second transistor having said second transistor gate, a second transistor source and a second transistor drain, where said second transistor source is connected to said data line and second transistor drain is connected to a first electrode of an electroluminescent cell.*

*18. The display of claim 15 wherein a number of ILLUMINATE periods and LOAD periods that are used to illuminate said electroluminescent cell during a frame time is equivalent to a number of bits used to define a number of levels of gray.*

*19. An electroluminescent display comprising an array of pixels, each pixel comprising:*

*a first transistor, a second transistor and an electroluminescent cell;*

*said first transistor having a first transistor gate connected to a select line, a first transistor source connected to a data line, and a first transistor drain connected to a second transistor gate of said second transistor;*

*said second transistor having a second transistor source connected to said select line and a second transistor drain coupled to a first electrode of said electroluminescent cell; and*

*said electroluminescent cell having a second electrode coupled to means for providing an alternating current to the electroluminescent cell.*

*20. The display of claim 19 further comprising:*

*a first capacitor, connected between said second transistor drain and said first electrode of said electrolumines-*

*cent cell, for coupling said second transistor to said electroluminescent cell.*

*21. The display of claim 19, further comprising:*

*a second capacitor, connected between said second electrode of said electroluminescent cell and said means for providing an alternating current, for coupling said electroluminescent cell to said means for providing alternating current.*

* * * * *